(12) United States Patent
Tano et al.

(10) Patent No.: US 7,862,745 B2
(45) Date of Patent: Jan. 4, 2011

(54) LIQUID CRYSTALLINE POLYESTER COMPOSITION AND MOLDED ARTICLE USING THE SAME

(75) Inventors: Daisuke Tano, Ushiku (JP); Hiroshi Harada, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/285,459

(22) Filed: Oct. 6, 2008

(65) Prior Publication Data

US 2009/0108234 A1  Apr. 30, 2009

(30) Foreign Application Priority Data

Oct. 10, 2007 (JP) ............................. 2007-264158
Jun. 11, 2008 (JP) ............................. 2008-152625

(51) Int. Cl.
*C09K 19/00* (2006.01)
*C09K 19/06* (2006.01)
*C09K 19/52* (2006.01)
*G02F 1/1333* (2006.01)

(52) U.S. Cl. ............................. 252/299.6; 252/299.01; 430/20; 349/117; 428/1.1

(58) Field of Classification Search ............ 252/299.01, 252/299.1, 299.6; 428/1.1; 430/20; 349/117
See application file for complete search history.

(56) References Cited

U.S. PATENT DOCUMENTS 5,409,979 A  4/1995  Nakai

FOREIGN PATENT DOCUMENTS

| JP | 3459768 | 8/2003 |
|---|---|---|
| JP | 2004-83870 | 3/2004 |
| JP | 2006-117736 | 5/2006 |

OTHER PUBLICATIONS

Fedors, "A Method for Estimating Both the Solubility Parameters and Molar Volumes of Liquids," *Polymer Engineering and Science*, Feb. 1974, vol. 14, No. 2, pp. 147-154.

*Primary Examiner*—Geraldina Visconti
(74) *Attorney, Agent, or Firm*—Foley & Lardner LLP (57) ABSTRACT

The present invention provides a liquid crystalline polyester composition comprising (A) a liquid crystalline polyester having a solubility parameter $\sigma_A$ of from 13 $(cal/cm^3)^{1/2}$ to 13.5 $(cal/cm^3)^{1/2}$ and (B) a polyhydric alcohol fatty acid ester having a solubility parameter $\sigma_B$ of from 9 $(cal/cm^3)^{1/2}$ to 9.5 $(cal/cm^3)^{1/2}$, wherein the component (B) is contained in the amount of from 0.1 to 1 parts by weight on the basis of 100 parts by weight of the component (A). The composition has a good mold releasing property to dies in a melt molding at the time of producing a molded article by melt molding the composition and providing a molded article with sufficiently reduced blisters.

10 Claims, 1 Drawing Sheet

Fig. 1

LIQUID CRYSTALLINE POLYESTER COMPOSITION AND MOLDED ARTICLE USING THE SAME

BACKGROUND OF THE INVENTION

1. Field of the Invention

The invention relates to a liquid crystalline polyester composition excellent in moldability and a molded article thereof.

2. Description of the Related Art

Along with miniaturization and advancement of electric and electronic parts, a resin material for producing these parts have been required to have advanced properties such as high fluidity, high heat resistance, inflammability, chemical resistance, high strength, and the like and various thermoplastic resins and compositions thereof have been developed. A liquid crystalline polyester among thermoplastic resins can satisfy the above-mentioned properties in high levels and is characterized in that they are particularly excellent in fluidity. Owing to such a characteristic, a liquid crystalline polyester is relatively easy to be processed by melt molding for parts having thin portions and accordingly has been used widely for producing thin molded bodies and molded bodies with complicated shapes.

However, at the time of producing a molded article with a complicated shape from a thermoplastic resin or thermoplastic resin composition by melt molding, molds used for the melt molding (generally, dies) and a molded article obtained in the dies are inferior in the mold releasing property and so-called a mold releasing failure sometimes tends to occur easily. If such a mold releasing failure occurs, the obtained molded article is deformed and thus it becomes difficult to obtain a molded article with a desired shape or it becomes difficult to take the deformed molded article out of the dies, resulting in decrease of the productivity of the molded article.

As a method for solving such problems, a method of coating the inner surface of dies with a chemical agent having a mold releasing property for the dies and a molded article, or a method of forming a protective film on the inner surface of the dies by carrying out heat treatment or the like, if necessary, after the coating, has been employed in general. In this case, the chemical agent to be applied to the inner surface of the dies is generally called as "external release agent". On the other hand, an additive capable of improving the mold releasing property of a molded article to be obtained by adding to a thermoplastic resin is sometimes employed. Such an additive is generally called as "internal release agent". When the internal release agent is used, it is advantageous in a point that the productivity of melt molding is not lowered as compared with the case of using the external release agent that is required to apply to the inner surfaces of dies every prescribed times of melt molding.

For example, Japanese Patent Application Laid-Open (JP-A) No. 2-208353 (Claims and Examples) discloses ester of pentaerythritol stearic acid as an internal release agent to be used for melt molding using a liquid crystalline polyester and it discloses that use of such a compound can prevent discoloration of a molded article and gas emission at the time of melt molding though it is excellent in mold releasing property as compared with glycerin tristearate or the like which has conventionally been used as an internal release agent.

SUMMARY OF THE INVENTION

With respect to a liquid crystalline polyester composition containing ester of pentaerythritol stearic acid as an internal release agent described specifically in the Japanese Patent Application Laid-Open (JP-A) No. 2-208353 (Claims and Examples), the mold releasing property between an obtained molded article and dies are not necessarily satisfactory. On the basis of the investigations of the inventors of the present invention, it is found that in the case of using ester of pentaerythritol stearic acid, an internal release agent described specifically in the Japanese Patent Application Laid-Open (JP-A) No. 2-208353 (Claims and Examples), if soldering treatment is carried out for the obtained molded article, swelling deformation (foaming), so-called blister, tends to be caused easily on the surface of the molded article. While such soldering treatment is required for electric and electronic parts such as surface-mount parts, molded bodies easy to cause blisters are sometimes difficult to be used for surface-mount parts.

Accordingly, one objects of the present invention is to provide a liquid crystalline polyester composition having a good mold releasing property to dies in a melt molding at the time of producing a molded article by melt molding the liquid crystalline polyester composition and providing a molded article with sufficiently reduced blisters or the like.

The inventors of the invention have intensively studied to solve the above-mentioned problem and consequently have completed the invention.

That is, the invention provides <1> a liquid crystalline polyester composition comprising:

(A) a liquid crystalline polyester having a solubility parameter $\sigma_A$ of from 13 $(cal/cm^3)^{1/2}$ to 13.6 $(cal/cm^3)^{1/2}$; and (B) a polyhydric alcohol fatty acid ester having a solubility parameter $\sigma_B$ of from 9 $(cal/cm^3)^{1/2}$ to 9.5 $(cal/cm^3)^{1/2}$, wherein the component (B) is contained in the amount of from 0.1 to 1 parts by weight on the basis of 100 parts by weight of the component.

The invention further provides the following <2> to <5> as preferable embodiments according to <1>.

<2> The liquid crystalline polyester composition according to the composition <1>, wherein the difference $(\sigma_A - \sigma_B)$ in the solubility parameters between the liquid crystalline polyester and the polyhydric alcohol fatty acid ester is in the range of form 3.8 $(cal/cm^3)^{1/2}$ to 4.6 $(cal/cm^3)^{1/2}$.

<3> The liquid crystalline polyester composition according to the composition <1> or <2>, wherein the polyhydric alcohol fatty acid ester is a polyhydric alcohol fatty acid ester of which weight is reduced by 5% by weight at a temperature of about 250° C. on the basis of its weight at a temperature of 30° C. in a thermogravimetric analysis.

<4> The liquid crystalline polyester composition according to any one of the compositions <1> to <3>, wherein the liquid crystalline polyester is a liquid crystalline polyester having a flowing-out starting temperature of 280° C. or higher.

<5> The liquid crystalline polyester composition according to any one of the compositions <1> to <4>, wherein the liquid crystalline polyester is a liquid crystalline polyester having:

a structural unit derived from p-hydroxybenzoic acid and a structural unit derived from 2-hydroxy-6-naphthoic acid in their total amount of 30 to 80% by mole;

a structural unit derived from 4,4'-dihydroxybiphenyl and a structural unit derived from hydroquinone in their total amount of 10 to 35% by mole; and a structural unit derived from terephthalic acid, a structural unit derived from isophthalic acid, and a structural unit derived from 2,6-naphthalenedicarboxylic acid in their total amount of 10 to 35% by mole; the molar amounts above being on the basis of the total amounts of the entire structural units.

The invention further provides a molded article obtainable by molding any one of the liquid crystalline polyester compositions <1> to <5>.

According to the liquid crystalline polyester composition of the invention, it is possible to produce a molded article having a good mold releasing property to dies while sufficiently preventing occurrence of formation failure due to, e.g. blisters. Such mold releasing property is particularly effective in the case an intended molded article has a thin part or a complicated shape and a molded article of the liquid crystalline polyester composition of the invention can be used particularly preferably for electric and electronic parts and thus is industrially useful.

DETAILED DESCRIPTION OF THE PREFERRED EMBODIMENTS

The invention will be described more in detail hereinafter. Typically, dies made of metal is used a mold in a melt molding method of the liquid crystalline polyester composition, and therefore, a melt molding method using the metal dies will be described below as one of preferred embodiments of the present invention, which should not be construed as a limitation upon the scope of the present invention. Dies made of, for instance, a ceramic may be used in the present invention if the dies are sufficiently durable to a temperature condition or other conditions for a melt molding of the liquid crystalline polyester composition.

A liquid crystalline polyester composition of the present invention comprises:

(A) a liquid crystalline polyester having a solubility parameter $\sigma_A$ (described below) of from 13 $(cal/cm^3)^{1/2}$ to 13.6 $(cal/cm^3)^{1/2}$; and (B) a polyhydric alcohol fatty acid ester having a solubility parameter $\sigma_B$ (described below) of from 9 $(cal/cm^3)^{1/2}$ to 9.5 $(cal/cm^3)^{1/2}$, wherein the component (B) is contained in the amount of from 0.1 to 1 parts by weight on the basis of 100 parts by weight of the component (A).

When the solubility parameter $\sigma_A$ of the liquid crystalline polyester is in the range of from 13 $(cal/cm^3)^{1/2}$ to 13.6 $(cal/cm^3)^{1/2}$, and the solubility parameter $\sigma_B$ of the polyhydric alcohol fatty acid ester is lower than 9 $(cal/cm^3)^{1/2}$ or higher than 9.5 $(cal/cm^3)^{1/2}$, then the molded article obtained from the resulting composition tends to cause appearance failure due to, e.g. blisters. When the solubility parameter $\sigma_B$ of the polyhydric alcohol fatty acid ester is far below 9 $(cal/cm^3)^{1/2}$, then the dies are polluted in some extreme cases, probably because of bleeding out a large quantity of the polyhydric alcohol fatty acid ester to the surface of the molded article.

With respect to the liquid crystalline polyester composition of the invention, the difference in the solubility parameters, $\sigma_A-\sigma_B$, between the solubility parameter $\sigma_A$ $(cal/cm^3)^{1/2}$ of the liquid crystalline polyester and the solubility parameter $\sigma_B$ $(cal/cm^3)^{1/2}$ of the polyhydric alcohol fatty acid ester is preferably in the range of form 3.8 $(cal/cm^3)^{1/2}$ to 4.6 $(cal/cm^3)^{1/2}$. The inventors of the present invention have found that a liquid crystalline polyester composition satisfying the difference of such solubility parameters can exhibit a remarkably good mold releasing property of the resulting molded article and dies used for melt molding, and can sufficiently prevent appearance failure due to, e.g. blisters in the molded article.

Although the reason why the liquid crystalline polyester composition of the invention can exhibit an advanced mold releasing property and prevent occurrence of blisters is not necessarily made clear, the inventors of the present invention presume as follows.

When a liquid crystalline polyester composition containing an internal release agent is melt-molded, it is supposed that the internal release agent is to unevenly exist on the surface of the molded article having contact with the inner surfaces of dies and the internal release agent unevenly existing on the surface of the molded article accordingly exhibits the mold releasing property. To exhibit a good mold releasing property, the internal release agent unevenly existing on the surface of the molded article makes an adhesiveness of the molded article and the dies lower. If an internal release agent which does not exhibit a good mold releasing property unless a large quantity of the internal release agent exist unevenly on the surface of the molded article is used or if the agent is easy to bleed out to the surface of the molded article, the internal release agent existing unevenly on the surface of the molded article tends to easily cause blisters and if the amount of the used internal release agent is decreased to an extent that the blister formation can be prevented, it becomes difficult to exhibit a good mold releasing property.

With respect to the liquid crystalline polyester composition of the invention, it is supposed that since the liquid crystalline polyester and the polyhydric alcohol fatty acid ester are used and the weight ratio and the solubility parameters of both are defined within the above ranges, the polyhydric alcohol fatty acid ester can exhibit a good mold releasing property to the surface of the molded article and unevenly exists on the surface of the molded article to a proper extent so that it prevents occurrence of formation failure due to, e.g. blisters.

While the mold releasing property of a molded article and the occurrence of blisters tend to be contradictory, the occurrence of blisters can sufficiently be prevented and at the same time a liquid crystalline polyester composition having an excellent mold releasing property can be obtained when the difference $(\sigma_A-\sigma_B)$ between $\sigma_A$ and $\sigma_B$ is controlled to be in the range of from 3.8 $(cal/cm^3)^{1/2}$ to 4.6 $(cal/cm^3)^{1/2}$.

It is presumed that the difference of the solubility parameters affects the compatibility of the liquid crystalline polyester and the polyhydric alcohol fatty acid ester. If the difference $(\sigma_A-\sigma_B)$ is too large, the liquid crystalline polyester and the polyhydric alcohol fatty acid ester become hardly compatible and the polyhydric alcohol fatty acid ester tends to bleed out on the surface of the molded article to be obtained and the excess amount of the bleeding-out polyhydric alcohol fatty acid ester is thermally decomposed by soldering treatment to make blister formation easy. Further, in the case the amount of the bleeding out is high, problems such as pollution of the dies may be caused. On the other hand, if the difference $(\sigma_A-\sigma_B)$ is too small, the liquid crystalline polyester and the polyhydric alcohol fatty acid ester become easily compatible and accordingly, the polyhydric alcohol fatty acid ester hardly unevenly exists on the surface of the molded article to cause deterioration of the mold releasing property. Further, in an extreme case, the polyhydric alcohol fatty acid ester remaining in the inside of the molded article is increased and the remaining polyhydric alcohol fatty acid ester is thermally decomposed at the time of melt molding to sometimes cause an undesirable consequence that the molding itself becomes difficult. It is accordingly supposed that a combination of the liquid crystalline polyester and the polyhydric alcohol fatty acid ester satisfying the above difference of the solubility parameters in the invention can make the polyhydric alcohol fatty acid ester exist unevenly on the surface of the molded article so as to exhibit a good mold releasing property while sufficiently preventing occurrence of the blisters.

As described above, use of the liquid crystalline polyester and the polyhydric alcohol fatty acid ester having the solubility parameters within the range as described above and attainment of a molded article in which a good mold releasing property as well as occurrence prevention of blisters are highly compatible are not easily accomplished on the basis of the use of an internal release agent that has been employed mainly focusing the low critical surface tension and they are based on the proprietary findings of the inventors of the invention.

In the present invention, the difference $(\sigma_A-\sigma_B)$ in the solubility parameters is more preferably in the range of from 4 $(cal/cm^3)^{1/2}$ to 4.6 $(cal/cm^3)^{1/2}$.

In the liquid crystalline polyester composition of the present invention, the content of the polyhydric alcohol fatty acid ester (B) may be in the range of from 0.1 to 1 part by weight, is preferably in the range of from 0.1 to 0.5 parts by weight, on the basis of 100 parts by weight of the liquid crystalline polyester (A). When the content of the component (B) is lower than 0.1 part by weight on the basis of 100 parts by weight of the component (A), the resulting composition may become difficult to exhibit a good mold releasing property, probably because of an insufficient amount of the polyhydric alcohol fatty acid ester unevenly existing on the surface of the molded article obtained from the component. On the other hand, when the content of the component (B) exceeds 1 part by weight on the basis of 100 parts by weight of the component (A), the amount of the polyhydric alcohol fatty acid ester unevenly existing on the surface of the molded article is too large and sufficient prevention of occurrence of blisters sometimes becomes difficult.

A solubility parameter is a numeral value showing the extent of the agglomeration energy of a substance. In the present invention, the solubility parameter calculated by a method proposed by Fedors (Polym. Eng. Sci., Vol 14, P147 (1974), refers to as Fedors' method hereinafter) is employed. In the Fedors' method, the solubility parameter $\sigma$ is calculated by the equation below:

$$\sigma=(\Sigma\Delta er/\Sigma\Delta vi)^{1/2} \qquad (1)$$

wherein $\Delta er$ and $\Delta vi$ denote evaporation energy and molar volume of an atom or an atom group, respectively.

For example, the solubility parameter $\sigma_A$ of the liquid crystalline polyester (A) can be calculated as summation of the solubility parameters of the respective structural units composing the liquid crystalline polyester. The solubility parameters of the respective structural units can be calculated as multiplication of the solubility parameters of the respective structural units and the mole ratios of the respective structural units in the liquid crystalline polyester. For instance, when the liquid crystalline polyester is composed of two kinds of structural units, X and Y (hereinafter, referred to as "unit X" and "unit Y"); the amounts by weight of the unit X and unit Y are x (% by weight) and y (% by weight), respectively; the formula weights of the unit X and unit Y are Mx and My, respectively; and solubility parameters of the unit X and unit Y are SPx and Spy, then, the mole ratios of the respective units in the liquid crystalline polyester are x/Mx (% by mole) and y/My (% by mole), respectively. In such a case, the solubility parameter $\sigma_A$ of the liquid crystalline polyester can be calculated according to the equation below:

$$\sigma_A=[(x \times SPx/Mx)+(y \times SPy/My)] \qquad (2).$$

A liquid crystalline polyester to be used in the invention may be a conventionally known liquid crystalline polyesters as long as they have the solubility parameter $\sigma_A$ in the range of from 13 $(cal/cm^3)^{1/2}$ to 13.6 $(cal/cm^3)^{1/2}$, as mentioned above. A plurality of liquid crystalline polyesters having the solubility parameter $\sigma_A$ within such a range may be used in combination.

A liquid crystalline polyester is a polyester so-called as a thermotropic liquid crystal polymer and forms a melted body showing optical anisotropy at 450° C. or lower. For instance, the following can be exemplified:

(1) those obtained by polymerizing an aromatic hydroxycarboxylic acid, an aromatic dicarboxylic acid, and an aromatic diol in combination;

(2) those obtained by polymerizing a plurality of aromatic hydroxycarboxylic acids;

(3) those obtained by polymerizing an aromatic dicarboxylic acid and an aromatic diol in combination; and (4) those obtained by reaction of a crystalline polyester such as polyethylene terephthalate with an aromatic hydroxycarboxylic acid.

Additionally, in place of these aromatic hydroxycarboxylic acids, aromatic dicarboxylic acids, and aromatic diols, their ester-forming derivatives are preferably used since production of the liquid crystalline polyester is made easy.

The ester-forming derivatives may include, in the case of aromatic hydroxy carboxylic acids and aromatic dicarboxylic acids having a carboxyl group in the molecule, those in which the carboxyl group is converted into a highly reactive acid halide group or acid anhydride group and those in which the carboxyl group is forming ester with alcohols or ethylene glycols that can produce polyester by ester exchange reaction. Further, in the case of aromatic hydroxycarboxylic acids and aromatic diols having a phenolic hydroxyl group in the molecule, those in which the phenolic hydroxyl group is forming esters with lower carboxylic acids to produce polyesters by ester exchange reaction can be exemplified.

In aromatic hydroxycarboxylic acids, aromatic dicarboxylic acids, and aromatic diols, some or all of the hydrogen atoms in their aromatic rings may be substituted with a halogen atom such as a chlorine atom or a fluorine atom, an alkyl group such as a methyl group or an ethyl group and an aryl group such as a phenyl group to an extent that the ester formability is not inhibited.

A structural unit of the liquid crystalline polyester of the invention can be exemplified as follows.

Structural units derived from aromatic hydroxycarboxylic acids.

(A₁)

-continued (A₂)

The above structural units may have a halogen atom, an alkyl group, or an aryl group in the aromatic ring as a substituent group.

Structural unit derived from aromatic dicarboxylic acids.

(B₁)

(B₂)

(B₃)

The above structural units may have a halogen atom, an alkyl group, or an aryl group in the aromatic ring as a substituent group.

Structural unit derived from aromatic diols.

(C₁)

(C₂)

(C₃)

The above structural units may have a halogen atom, an alkyl group, or an aryl group in the aromatic ring as a substituent group.

Specifically, examples of combinations of structural units composing the liquid crystalline polyester include the following (a) to (h):

(a): combinations of units ($A_1$), ($B_1$) and ($C_1$) or combinations of units ($A_1$), ($B_1$), ($B_2$) and ($C_1$);

(b): combinations of units ($A_2$), ($B_3$) and ($C_2$) or combinations of units ($A_2$), ($B_1$), ($B_3$) and ($C_2$);

(c): combinations of units ($A_1$) and ($A_2$);

(d): those obtained by partially or entirely replacing unit ($A_1$) with unit ($A_2$) in the combination (a);

(e): those obtained by partially or entirely replacing unit ($B_1$) with unit ($B_3$) in the combination (a);

(f): those obtained by partially or entirely replacing unit ($C_1$) with unit ($C_3$) in the combination (a);

(g): those obtained by partially or entirely replacing unit ($A_2$) with unit ($A_1$) in the combination (b); and (h): those obtained by adding units ($B_1$) and ($C_2$) to the combination (c).

With respect to the liquid crystalline polyesters of combinations (a) and (b), they are exemplified respectively in Japanese Patent Application Publication (JP-B) Nos. 47-47870 and 63-3888.

In terms of the balance of heat resistance, mechanical properties, and processability, particularly preferable liquid crystalline polyesters are those which contain at least 30% by mol of the structural unit defined as the unit ($A_1$) above based on the total of the entire structural units.

Exemplifying combinations of the structural units according to combinations (a) to (h), which are the preferably liquid crystalline polyesters, a method for calculating $\sigma_A$ is substantially described below. The solubility parameters of the structural units according to these combinations are as following Table 1.

TABLE 1

| Structural unit | Solubility parameter σ ((cal/cm$^3$)$^{1/2}$) |
|---|---|
| (A$_1$) | 13.7 |
| (A$_2$) | 14.9 |
| (B$_1$) | 14.7 |
| (B$_2$) | 14.7 |
| (B$_3$) | 15.6 |
| (C$_1$) | 12.2 |
| (C$_2$) | 12.4 |
| (C$_3$) | 12.4 |

Based on the solubility parameter σ and the mole ratio calculated from the formula weight and mass weight fraction of each structural unit as shown in Table 1, the solubility parameter $\sigma_A$ of the liquid crystalline polyester can be calculated by the addition formula explained in the equation (2) above. Further, based on the each structural unit and mole ratio thereof, the $\sigma_A$ can be controlled to be in the range of from 13 (cal/cm$^3$)$^{1/2}$ to 13.6 (cal/cm$^3$)$^{1/2}$.

A production method of a liquid crystalline polyester can be applied by a method such as disclosed in, for instance, in Japanese Patent Application Laid-Open (JP-A) No. 2002-146003. To simply described the production method disclosed in this specification, the method is such that a monomer for producing a liquid crystalline polyester (e.g. an aromatic hydroxycarboxylic acid, an aromatic dicarboxylic acid, an aromatic diol, and ester-forming derivatives thereof) is subjected to melt-polymerization to obtain an aromatic polyester with a relatively low molecular weight (hereinafter, referred to as "prepolymer" for short); next, pulverizing the prepolymer to obtain a powder; heating the powder; and carrying out polymerization in solid phase. If such a solid-phase polymerization is employed, polymerization is promoted further to obtain a liquid crystalline polyester with a higher molecular weight.

In such a production method, the mole ratios of the respective structural units composing the liquid crystalline polyester can easily be controlled in accordance with feeding amounts of the monomers to be used.

The flowing-out starting temperature (TA) of the liquid crystalline polyester is preferably 280° C. or higher. The liquid crystalline polyester (A) has an advantage that a molded article excellent in heat resistance can be obtained, however since the temperature condition of the melt molding becomes a higher temperature, the mold releasing property of the molded article and the dies are sometimes deteriorated. With respect to the liquid crystalline polyester composition of the invention, even if a liquid crystalline polyester with a higher flowing-out starting temperature is used, excellent mold releasing property can be exhibited and a molded article with excellent heat resistance can be easily obtained.

To obtain a molded article more excellent in heat resistance, the flowing-out starting temperature (TA) of the liquid crystalline polyester is preferably 300° C. or higher and more preferably 320° C. or higher. In this connection, the flowing-out starting temperature is an index showing the molecular weight of the liquid crystalline polyester that is well known in the art (reference to KOIDE Naoyuki, "Synthesis, Formation, and Application of Liquid Crystal Polymers", p 95-105, CMC, Jun. 5, 1987: in this invention, "Flow Tester CFT-500D, a fluidization property evaluation apparatus, manufactured by Shimadzu Corporation is used).

In terms of exhibiting better liquid crystallinity, the liquid crystalline polyester to be used in the invention is preferably a liquid crystalline polyester containing:

a structural unit (A$_1$) derived from p-hydroxybenzoic acid and a structural unit (A$_2$) derived from 2-hydroxy-6-naphthoic acid in the total amount of units (A$_1$) and (A$_2$) of from 30 to 80% by mole on the basis of the total amount of the entire structural units;

a structural unit (B$_1$) derived from terephthalic acid, a structural unit (B$_2$) derived from isophthalic acid, and a structural unit (B$_3$) derived from 2,6-naphthalenedicarboxylic acid in the total amount of units (B$_1$), (B$_2$) and (B$_3$) of from 10 to 35% by mole on the basis of the total amount of the entire structural units; and a structural unit (C$_1$) derived from hydroquinone and a structural unit (C$_2$) derived from 4,4'-dihydroxybiphenyl in the total amount of units (C$_1$) and (C$_2$) of from 10 to 35% by mole on the basis of the total amount of the entire structural units. Such structural units and mole ratios thereof (copolymerization ratios) are appropriately determined so that the range of the solubility parameter $\sigma_A$ can be adjusted to be in the range of from 13 (cal/cm$^3$)$^{1/2}$ to 13.6 (cal/cm$^3$)$^{1/2}$.

In the liquid crystalline polyester composition of the present invention, a polyhydric alcohol fatty acid ester is contained as the component (B) therein. The polyhydric alcohol fatty acid ester is a partial ester or a full ester of a fatty acid and a polyhydric alcohol and has the solubility parameter $\sigma_B$ in the range of from 9 (cal/cm$^3$)$^{1/2}$ to 9.5 (cal/cm$^3$)$^{1/2}$. One or two or more kinds of the polyhydric alcohol fatty acid ester can be used in combination in a range in which the solubility parameter is satisfied with the range. The full ester means an ester compound in which all hydroxyl groups of a polyhydric alcohol are esterified, and the partial ester means a ester compound in which some of hydroxyl groups of a polyhydric alcohol are esterified.

The fatty acid is preferably higher fatty acids having 10 to 32 carbon atoms when adjusting $\sigma_B$ within the above range. Specific examples of the higher fatty acids include saturated fatty acids such as decanoic acid, undecanoic acid, dodecanoic acid, tridecanoic acid, tetradecanoic acid, pentadecanoic acid, hexadecanoic acid (palmitic acid), heptadecanoic acid, octadecanoic acid (stearic acid), nanodecanoic acid, icosanoic acid, docosanoic acid, and hexacosanoic acid; and unsaturated fatty acids such as palmitoleic acid, oleic acid, linoleic acid, linolenic acid, eicosenoic acid, eicosapentaenoic acid and setoleic acid. Among them, those having 10 to 22 carbon atoms are preferable as the higher fatty acids, and those having 14 to 20 carbon atoms are more preferable. Among the above examples, for instance, stearic acid and palmitic acid are mixtures which can be produced from natural fats and oils containing a plurality of fatty acids of different numbers of carbon atoms. The higher fatty acids which can be produced from natural fats and oils are relatively easily commercially available, and therefore, they are preferably used for producing polyhydric alcohol fatty acid esters to be used for the present invention.

On the other hand, polyhydric alcohols are preferably those having two or more alcoholic hydroxyl groups in the molecule and having 3 to 32 carbon atoms. Specific examples of the polyhydric alcohol include glycerin, diglycerin, polyglycerin (e.g. decaglycerin and the like), pentaerythritol, dipentaerythritol, diethylene glycol, and propylene glycol. The types of polyhydric alcohols, the types of higher fatty acids and the esterification ratio (full ester or partial ester) can be appropriately determined to obtain the polyhydric alcohol fatty acid ester having the solubility parameter $\sigma_B$ in the range of form 9 (cal/cm$^3$)$^{1/2}$ to 9.5 (cal/cm$^3$)$^{1/2}$, that is usable for the invention.

Further, among the polyhydric alcohol fatty acid esters, dipentaerythritol is preferable since the polyhydric alcohol fatty acid esters to be obtained by esterification with fatty acids tend to have higher heat resistance. Further, a higher esterification with fatty acids is preferable since $\sigma_B$ is more easily controllable within the range mentioned above. From these points of view, dipentaerythritol hexastearate (having $\sigma_B$ of 9 $(cal/cm^3)^{1/2}$ is particularly preferable as the polyhydric alcohol fatty acid ester.

The polyhydric alcohol fatty acid ester to be used in the present invention can be obtained by esterification of a polyhydric alcohol and a fatty acid by a conventional esterification reaction. The hydroxyl equivalent of the polyhydric alcohol and the mole equivalent of the fatty acid may appropriately be adjusted at the time of esterification reaction to separately produce a partial ester or a full ester.

Those having the solubility parameter $\sigma_B$ within the above range can be selected from products easily commercially available to be used. Examples of the ester containing mainly the preferable dipentaerythritol hexastearate mentioned above include LOXIOL VPG 2571 (manufactured by Cognis Oleochemicals, Japan) and the like. Such commercialized products can be used as they are since those have relatively high purity, however, they may be used after refining treatment, if necessary.

The polyhydric alcohol fatty acid ester to be used as the component (B) is preferably has a 5% weight reduction temperature (TB) of 250° C. or higher, which can be calculated from TGA (thermogravimetric analysis). The "5% weight reduction temperature (TB)" means a temperature at which the weight of a material to be measured is reduced by 5% by weight on the basis of the weight at a temperature of 30° C. in a thermogravimetric analysis. The polyhydric alcohol fatty acid ester having a 5% weight reduction temperature (TB) of lower than 250° C. tends to be easily, thermally decomposed in a melt molding when a liquid crystalline polyester with a relatively high melt molding temperature is used together and when the melt molding takes long time. In such a case, there is a possibility that an effective amount of the polyhydric alcohol fatty acid ester for the mold releasing property cannot remain in the resulting molded article. As the TB of the polyhydric alcohol fatty acid ester is higher, such inconvenience can well be avoided and thus use of the polyhydric alcohol fatty acid ester having TB of 280° C. or higher is more preferable for the liquid crystalline polyester composition of the present invention. Even when the polyhydric alcohol fatty acid ester having TB of 250° C. or higher is melt-molded in combination with any of a liquid crystalline polyester formable a melt body at 450° C. or lower, the ester has a sufficiently high heat resistance enough to exhibit a good mold releasing property. Pentaerythritol hexastearate, that is the above-mentioned preferable polyhydric alcohol fatty acid ester, has TB of 290° C. and has a sufficiently high heat resistance.

The 5% weight reduction temperature is measured using a thermogravimetric apparatus. More specifically, the 5% weight reduction temperature can be obtained by a themogravimetry analysis conducted under the conditions of starting temperature of 30° C. and finishing temperature of 500° C. at a heating rate of 20° C./min in nitrogen atmosphere. The temperature at which the weight of the material to be measured is decreased to be 95% by weight due to the increase of temperature on the basis (100% by weight) of the weight of the material at the starting temperature of 30° C., is regarded as a 0.5% weight reduction temperature of the material.

The liquid crystalline polyester composition of the present invention may be obtained by mixing the liquid crystalline polyester (A) and the polyhydric alcohol fatty acid ester (B), both satisfying the above-mentioned solubility parameters.

The liquid crystalline polyester composition of the present invention may contain a filler such as glass fibers, a coloring agent such as a dye and a pigment, and additives such as an antioxidant, a heat stabilizer, an ultraviolet absorbent, an antistatic agent and a surfactant in a range that the intended purpose of the invention is not remarkably deteriorated.

A method for producing the liquid crystalline polyester composition is not particularly limited. Preferably, the liquid crystalline polyester composition is obtained by mixing the liquid crystalline polyester, the polyhydric alcohol fatty acid ester and an optional filler or an optional additive with a Henschel mixer, a tumbler or the like and then conducting melt kneading with an extruder, which can be followed by palletizing in the melt-kneading step.

The liquid crystalline polyester composition thus obtained may be molded in an appropriate manner in accordance with the shape of an intended part. Preferable molding is an injection molding. In the injection molding, a molded article with a complicated shape having thin parts tends to be relatively easily obtained. The molded article obtained by injection molding the liquid crystalline polyester composition of the present invention is particularly preferable for use as an electric or electronic part or the like.

Preferable molding conditions are as follows:

At first, the liquid crystalline polyester composition of the present invention is subjected to heating and melting. At that time, the melting temperature may be about the same as or higher than the flowing-out starting temperature TA (° C.) of the liquid crystalline polyester, or about the same as or higher than the flowing-out starting temperature FT (° C.) of the composition pellets when the liquid crystalline polyester composition is used after being pelletized as described above. The flowing-out starting temperature FT of the composition pellets is measured by the same method as the method of measuring the above flowing-out starting temperature measurement of the liquid crystalline polyester. When only one type liquid crystalline polyester is used for preparation of the composition pellets, the flowing-out starting temperature FT of the composition pellets and the flowing-out starting temperature (TA) of the liquid crystalline polyester are substantially equal.

Herein, one example of the injection moldings will be described using the composition pellets of the liquid crystalline polyester composition. The composition pellets are preferable to be dried before use for injection molding.

When the composition pellets with the flowing-out starting temperature FT (° C.) is used, the melting temperature is preferably in the range of from FT (° C.) to [FT+70] (° C.). The melted liquid crystalline polyester composition is injected to dies having a cavity with a desired shape. Dies set at a temperature of 0° C. or higher may be used.

If injection molding is carried out at a melting temperature lower than FT (° C.), the fluidity of the composition tends to be lower, and the cavity with a fine shape in the dies may not be completely filled, or the transfer property of the composition to the die faces tends to become inferior to roughen the surface of the resulting molded article, and therefore, the injection molding at a temperature lower than FT (° C.) is not preferable. On the other hand, if injection molding is carried out at a melting temperature higher than [FT+70]° C., the liquid crystalline polyester stagnated in the molding apparatus tends to be decomposed, which may easily cause formation failure of the resulting molded article; or a molded article easy to generate degassing may be obtained; or after injection molding, a melt resin tends to flow easily out of a nozzle at the time of opening the dies and taking the resulting molded article out of the dies. If the molded article easy to generate degassing is used for various kinds of parts, the gas tends to cause a bad effect and thus sometimes makes it difficult to use the molded article for various purposes. When the melt resin flows out of the nozzle at the time of opening the dies and taking a molded article out of the dies, the flowing out melt resin forms so-called burr to make it difficult to obtain a molded article with a desired form and the burr need to be removed in a successive process and accordingly it may result in a problem of productivity decrease of the molded article. In view of avoiding such inconvenience successfully and having stability and processibility of the resulting molded article, the melting temperature is preferably in the range of from [FT+10] (° C.) to [FT+60] (° C.); and more preferably, in the range of from [FT+15] (° C.) to [FT+50] (° C.).

While the die temperature is preferably set generally at 0° C. or higher as described above, the die temperature is not necessarily limited and may be determined depending on the appearance, size, mechanical properties and processibility of the resulting molded article, and productivity such as molding cycles or the like. Preferably, the die temperature is 40° C. or higher. When the die temperature is lower than 40° C., it may become difficult to control the die temperature at the time of continuous molding, and the resulting temperature fluctuation sometimes causes a bad effect on the molded article. The die temperature is more preferably 50° C. or higher, and is most preferably 70° C. or higher. when the die temperature is lower than 70° C., the surface smoothness of the resulting molded article tends to be deteriorated. In view of the improvement of the surface smoothness, it is more advantageous as the die temperature is higher; however when it is too high, the cooling effect may be lowered and it may take a long time for a cooling step, which may decrease productivity. On the other hand, when the die temperature is too high, intermeshing of dies may be worsened, and at the time of opening or closing dies, the die tends to be deteriorated. The upper limit of the die temperature can be appropriately determined depending on the types of composition pellets to be employed in order to prevent decomposition of the liquid crystalline polyester contained in the composition pellets. In such a viewpoint, the die temperature is preferably 220° C. or lower, and more preferably 200° C. or lower.

The molded article obtained from the liquid crystalline polyester composition of the present invention may be used for casings of electric and electronic appliances parts of electronic appliances such as a power generator, an electric motor, a transformer, a current transformer, a voltage regulator, a rectifier, an inverter, a relay, a contact for electric power, a switchgear, a breaker, a knife switch, a multipolar rod, an electric part cabinet, a socket and a relay case. The molded article is also preferably usable for electronic parts such as a sensor, a LED lamp, a lamp socket, a lamp reflector, a lamp housing, a connector, a compact switch, a coil bobbin, a capacitor, an oscillator, various kinds of terminal plates, a converters, a plug, a printed board, a compact motor, a magnetic head base, a power module, a hard disk drive part (e.g. a hard disk drive hub, an actuator, a hard disk substrate, and the like), and a DVD part (e.g. an optical pick up).

Furthermore, the molded article is also applicable for a semiconductor device, a resin for sealing such as a coil, an optical appliance part for a camera, a part such as a bearing that generates friction heat, a heat release part such as a part relevant to an automobile and a vehicle, and an insulating plate for an electric part.

Among them, the liquid crystalline polyester composition of the invention is particularly useful for molding a relay case and a connector sometime having a relatively complicated shape and thin parts.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of the Japanese Patent Applications Nos. 2007-264158 filed on Oct. 10, 2007 and 2008-152625 filed on Jun. 11, 2008, including specifications, claims, drawings and summaries, are incorporated herein by reference in their entirety.

EXAMPLES

The present invention is described in more detail by following Examples, which should not be construed as a limitation upon the scope of the present invention.

The following release agents 1 to 4 were used as an internal release agent.

Release agent 1: dipentaerythritol hexastearate
Solubility parameter: 9.0 $(cal/cm^3)^{1/2}$
5% weight reduction temperature (TB): 260° C.
Release agent 2: pentaerythritol tetrastearate
Solubility parameter: 8.7 $(cal/cm^3)^{1/2}$
5% weight reduction temperature (TB): 310° C.
Release agent 3: glycerine tristearate
Solubility parameter: 6.7 $(cal/cm^3)^{1/2}$
5% weight reduction temperature (TB): 340° C.
Release agent 4: sorbitan tristearate
Solubility parameter: 9.7 $(cal/cm^3)^{1/2}$
5% weight reduction temperature (TB): 280° C.

The 5% weight reduction temperatures of the above release agents 1 to 4 were measured as follows.

Thermogravimetric analysis was carried out by using a thermogravimetric apparatus (DTG-60, manufactured by Shimadzu Corporation) in conditions of starting temperature 30° C., finishing temperature 500° C., heating velocity 20° C./min in nitrogen atmosphere and in the case the sample weight at the starting temperature 30° C. was defined as 100% by weight, the temperature at which the sample weight was decreased to 95% by weight due to increase of temperature was measured as the 5% weight reduction temperature.

The flowing-out starting temperature (TA) of the liquid crystalline polyester was measured as follows.

A capillary rheometer having a nozzle with an inner diameter of 1 mm and a length of 10 mm ("Flow Tester CFT-500D, a fluidization property evaluation apparatus, manufactured by Shimadzu Corporation) was used, and a temperature at which the melt viscosity became 4800 Pass was measured when heated melt was extruded at 4° C./min by the nozzle under a load of 9.8 MPa.

Blister (Foaming) Evaluation:

Dumbbell-type test pieces [JIS K7113 (½)] were formed in Examples 1 to 3 and Comparative Examples 1 to 5 and the obtained test pieces were immersed in solder baths kept at temperatures in every 5° C. interval up to 270° C. for 60 seconds and thereafter, the test pieces were observed visually. Those which were free from blisters (foaming) were marked with "o" and those which had blisters (forming) were marked with "x".

Dumbbell-type test pieces [JIS K7113 (½)] were formed in Examples 4 and the obtained test pieces were immersed in solder baths kept at temperatures in every 5° C. interval up to 330° C. for 60 seconds and thereafter, the test pieces were observed visually. Those which were free from blisters (foaming) were marked with "o" and those which had blisters (forming) were marked with "x"

Tensile Strength and Modulus of Elongation:

ASTM No. 4 type tensile dumbbell type test pieces were formed and the obtained test pieces were subjected to measurement of tensile strength and modulus of elongation according to ASTM D638.

Bending Strength and Bending Elastic Modulus:

Rod shape test pieces having width of 12.7 mm, length of 127 mm and thickness of 6.4 mm were formed and the obtained test pieces were subjected to measurement of bending strength and bending elastic modulus according to ASTM D790.

Figure 1:
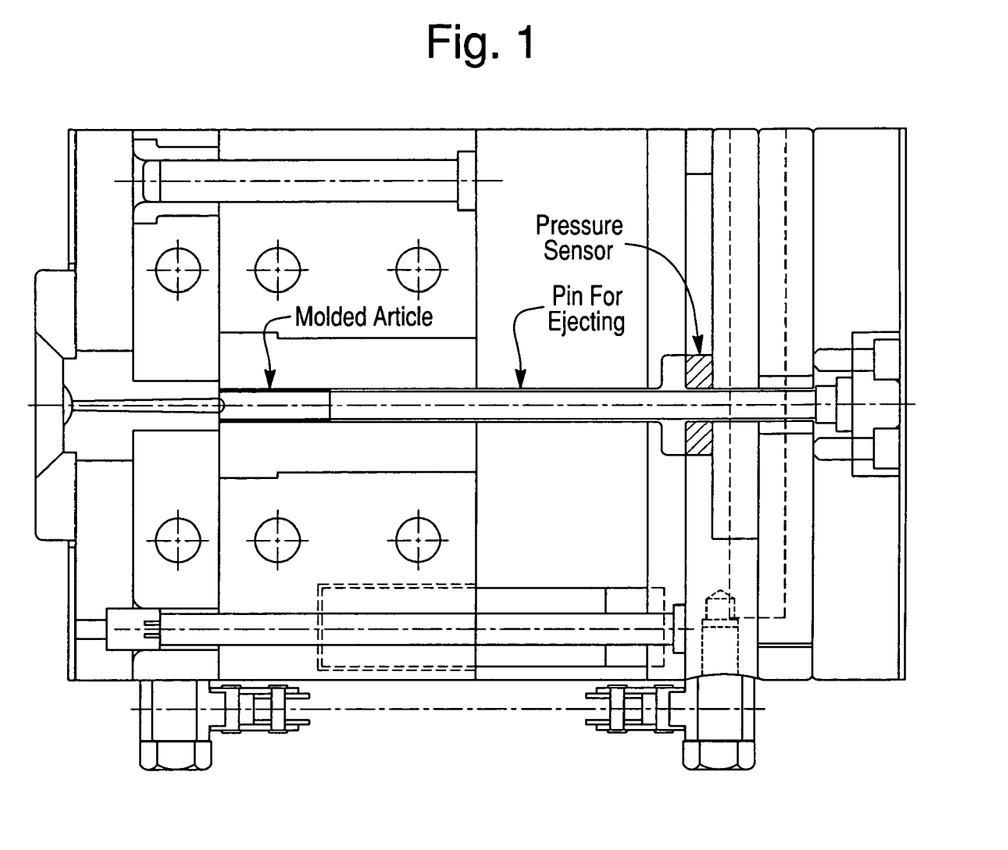
FIG. 1 is a schematic drawing showing dies for measuring release resistance.

Measurement of Release Resistance:

Obtained pellets were used for forming test pieces with 0 taper by using an injection molding apparatus (ES-400 model, manufactured by Nissei Plastic Industrial Co., Ltd.) and dies for release resistance measurement shown in FIG. 1 and core-cavity co-injection of $\phi 11 \times \phi 15 \times 20$ mm at cylinder temperature of 350° C., die temperature of 130° C., retained pressure of 1400 kg/cm$^2$ or 1700 kg/cm$^2$, and constant injection speed and the pressure needed for taking out the test pieces was measured as the release resistance.

Production of Liquid Crystalline Polyester:

Production Example 1

A reactor equipped with a stirrer, a torque meter, a nitrogen gas introduction tube, a thermometer, and a reflux condenser was fed with 621 g (4.5 mole) of p-hydroxybenzoic acid, 279 g (1.5 mole) of 4,4'-dihydroxybiphenyl, 149.4 g (0.9 mole) of terephthalic acid, 99.6 g (0.6 mole) of isophthalic acid, and 841.5 g (8.25 mole) of acetic anhydride and after the inside of the reactor was sufficiently replaced with nitrogen gas, the reactor was heated to 150° C. in 30 minutes under nitrogen gas flow and kept at the temperature and refluxing was carried out for 30 minutes.

Thereafter, while distilled by-product acetic acid and un-reacted acetic anhydride were removed, the temperature was increased to 315° C. in 3 hours and 30 minutes and completion of the reaction was set at a moment the torque was observed increasing to obtain a prepolymer.

The obtained prepolymer was cooled to room temperature and pulverized by a pulverizer to obtain a powder and the powder was heated under nitrogen atmosphere from room temperature to 230° C. in 1 hour and from 230° C. to 250° C. in 50 minutes and kept at 250° C. for 10 hours to carry out solid-phase polymerization. The liquid crystalline polyester obtained in such a manner was named as LCP 1. The solubility parameter $\sigma_A$ of LCP 1 was calculated to be 13.6 (cal/cm$^3$)$^{1/2}$. The flowing-out starting temperature of LCP 1 was 290° C.

Production Example 2

A reactor equipped with a stirrer, a torque meter, a nitrogen gas introduction tube, a thermometer, and a reflux condenser was loaded with 830.7 g (5.0 mole) of p-hydroxybenzoic acid, 465.5 g (2.5 mole) of 4,4'-dihydroxybiphenyl, 394.6 g (2.375 mole) of terephthalic acid, 20.8 g (0.125 mole) of isophthalic acid, and 1153 g (11.0 mole) of acetic anhydride and after the inside of the reactor was sufficiently replaced with nitrogen gas, the reactor was heated to 150° C. in 15 minutes under nitrogen gas flow and kept at the temperature and refluxing was carried out for 30 minutes.

Thereafter, while distilled by-product acetic acid and un-reacted acetic anhydride were removed, the temperature was increased to 320° C. in 2 hours and 50 minutes and completion of the reaction was set at a moment the torque was observed increasing to obtain a prepolymer.

The obtained prepolymer was cooled to room temperature and pulverized by a pulverizer to obtain a powder and the powder was heated under nitrogen atmosphere from room temperature to 250° C. in 1 hour and from 250° C. to 320° C. in 5 hours and kept at 320° C. for 3 hours to carry out solid-phase polymerization. The liquid crystalline polyester obtained in such a manner was named as LCP 2. The solubility parameter $\sigma_A$ of LCP 2 was calculated to be 13.6 (cal/cm$^3$)$^{1/2}$. The flowing-out starting temperature of LCP 1 was 380° C.

Examples 1 to 3 and Comparative Examples 1 to 5

LCP 1 obtained in Production Example 1, any one of the above release agents 1 to 4, and glass fibers (average fiber length 75 μm, manufactured by Central Glass Co., Ltd.) having compositions as shown in Table 2 and Table 3 (the compositions are shown as the use mounts of the release agents and glass fibers on the basis of 100 parts by weight of LCP 1) were melt kneaded and pelletized at 340° C. using a co-directional biaxial extruder (PCM-30, manufactured by Ikegai Iron Works, Ltd.).

The obtained pellets were formed into test pieces to be used for various evaluations by using injection molding apparatus (ES-400 model, manufactured by Nissei Plastic Industrial Co., Ltd.) and blister (foam) evaluation, tensile strength, modulus of elongation, bending strength, and bending elastic modulus were measured. The results are shown in Table 2 and Table 3.

Example 4

LCP 2 obtained in Production Example 2, the release agent 1, and glass fibers (average fiber length 75 μm, manufactured by Central Glass Co., Ltd.) having composition as shown in Table 2 (the composition is shown as the use mounts of the release agent and glass fibers on the basis of 100 parts by weight of LCP 2) was melt-kneaded and pelletized at 380° C. using a co-directional biaxial extruder (PCM-30, manufactured by Ikegai Iron Works, Ltd.).

The obtained pellets were formed into test pieces to be used for various evaluations by using injection molding apparatus (ES-400 model, manufactured by Nissei Plastic Industrial Co., Ltd.) and blister (foam) evaluation, tensile strength, modulus of elongation, bending strength, and bending elastic modulus were measured. The results are shown in Table 2.

TABLE 2

|  | Example 1 | Example 2 | Example 3 | Example 4 |
| --- | --- | --- | --- | --- |
| LCP 1 (SP value 13.0) | 100 | 100 | 100 |  |
| LCP 2 (SP value 13.3) |  |  |  | 100 |

TABLE 2-continued

|  |  | Example 1 | Example 2 | Example 3 | Example 4 |
|---|---|---|---|---|---|
| Release agent 1 | Dipentaerythritol hexastearate (SP value 9.0) | 0.1 | 0.5 | 1 | 1 |
| Release agent 2 | Pentaerythritol tetrastearate (SP value 8.7) |  |  |  |  |
| Release agent 3 | Glycerin tristearate (SP value 6.7) |  |  |  |  |
| Release agent 4 | Sorbitan tristearate (SP value 9.7) |  |  |  | 1 |
| Fiber-reinforcing material | Glass fibers | 30 | 30 | 30 | 30 |
|  | Solubility parameter difference ($\sigma_A - \sigma_B$) | 4.6 | 4.6 | 4.6 | 4.6 |
| Release resistance (kg/cm$^2$) | Pressure retention (1400 kg/cm$^2$) | 80 | 10 | 10 | 20 |
|  | Pressure retention (1700 kg/cm$^2$) | 200 | 35 | 20 | 40 |
|  | Foaming | ○ | ○ | ○ | ○ |
|  | Tensile strength (Mpa) | 150 | 150 | 145 | 145 |
|  | Modulus of elongation (Mpa) | 5500 | 5500 | 5300 | 5600 |
|  | Bending strength (Mpa) | 150 | 150 | 145 | 150 |
|  | Bending elastic modulus (Mpa) | 10500 | 10500 | 10500 | 11000 |
| Comprehensive evaluation |  | ○ | ○ | ○ | ○ |

TABLE 3

|  |  | Comparative Example 1 | Comparative Example 2 | Comparative Example 3 | Comparative Example 4 | Comparative Example 5 |
|---|---|---|---|---|---|---|
| LCP 1 (SP value 13.0) |  | 100 | 100 | 100 | 100 | 100 |
| LCP 2 (SP value 13.3) |  |  |  |  |  |  |
| Release agent 1 | Dipentaerythritol hexastearate (SP value 9.0) |  |  | 1.5 |  |  |
| Release agent 2 | Pentaerythritol tetrastearate (SP value 8.7) |  | 1 |  |  |  |
| Release agent 3 | Glycerin tristearate (SP value 6.7) |  |  |  | 1 |  |
| Release agent 4 | Sorbitan tristearate (SP value 9.7) |  |  |  |  | 1 |
| Fiber-reinforcing material | Glass fibers | 30 | 30 | 30 | 30 | 30 |
|  | Solubility parameter difference ($\sigma_A - \sigma_B$) | — | 4.9 | 4.6 | 6.9 | 3.9 |
| Release resistance (kg/cm$^2$) | Pressure retention (1400 kg/cm$^2$) | 200 | 50 | 10 | 120 | 80 |
|  | Pressure retention (1700 kg/cm$^2$) | 500 | 160 | 20 | 250 | 200 |
|  | Foaming | ○ | x | x | x | x |
|  | Tensile strength (Mpa) | 150 | 140 | 130 | 150 | 140 |
|  | Modulus of elongation (Mpa) | 5500 | 5300 | 5000 | 5300 | 5200 |
|  | Bending strength (Mpa) | 150 | 140 | 140 | 145 | 150 |
|  | Bending elastic modulus (Mpa) | 10500 | 10300 | 10000 | 10500 | 10500 |
| Comprehensive evaluation |  | x | x | x | x | x |

Comprehensive Evaluation:

With respect to liquid crystalline polyester compositions of Examples 1 to 4 and Comparative Examples 1 to 5, those having release resistance of 100 kg/cm$^2$ or lower and free from blister (foaming) marked with "o" were evaluated as "o" in the comprehensive evaluation. On the other hand, those having release resistance exceeding 100 kg/cm$^2$ or having blister (foaming) marked with "x" were evaluated as "x" in the comprehensive evaluation.

From the results in Table 1, in the liquid crystalline polyester compositions of Examples 1 to 4, a liquid crystalline polyester (A) has a solubility parameter $\sigma_A$ of 13.0 (cal/cm$^3$)$^{1/2}$ or higher and 13.6 (cal/cm$^3$)$^{1/2}$ or lower, and a polyhydric alcohol fatty acid ester (B) has a solubility parameter $\sigma_B$ of 9.0 (cal/cm$^3$)$^{1/2}$ or higher and 9.5 (cal/cm$^3$)$^{1/2}$ or lower, and the difference ($\sigma_A - \sigma_B$) is 3.8 (cal/cm$^3$)$^{1/2}$ or higher and 4.6 (cal/cm$^3$)$^{1/2}$ or lower. As a result, it was found that the liquid crystalline polyester compositions of Examples have release resistance of 100 kg/cm$^2$ or lower and free from blister formation (foaming) and thus were remarkably excellent in the mold releasing property and durability to soldering.

On the contrary, since the liquid crystalline polyester composition of Comparative Example 1 did not contain the polyhydric alcohol fatty acid ester (B), although blister formation (forming) did not occur, the release resistance exceeded 100 kg/cm² and separation of the molded article from dies was difficult.

With respect to the liquid crystalline polyester composition of Comparative Example 5, since the solubility parameter $\sigma_B$ of the release agent 4 was too high, the mold releasing property tended to be lowered and since the difference of the solubility parameter between LCP 1 and the release agent 4 was too small, blister formation (forming) occurred.

With respect to the liquid crystalline polyester composition of Comparative Example 3, the release agent 1, which was the polyhydric alcohol fatty acid ester satisfying the range of the solubility parameter CA of the invention, however since the addition amount thereof was too large and thus probably due to that the release agent 1 tended to unevenly exist beyond the necessity on the surface of the molded article, blister formation (forming) occurred. Further, probably due to that the release agent 1 existed in a large quantity in the inside of the molded article, the tensile strength and flexural modulus were lowered.

With respect to the liquid crystalline polyester composition of Comparative Example 4, since the solubility parameter $\sigma_B$ of the release agent 3 was too low and the difference of the solubility parameter between LCP 1 and the release agent 3 was too large and thus probably due to that the release agent 3 tended to bleed out easily to the surface of the molded article, blister formation (forming) occurred.

With respect to the liquid crystalline polyester composition of Comparative Example 5, since the solubility parameter $\sigma_B$ of the release agent 4 was too high, the mold releasing property tended to be lowered and since the difference of the solubility parameter between LCP 1 and the release agent 5 was too large and thus probably due to that the release agent 5 tended to bleed out easily to the surface of the molded article, blister formation (forming) occurred.

What is claimed is:

1. A liquid crystalline polyester composition comprising:
    (A) a liquid crystalline polyester having a solubility parameter $\sigma_A$ of from 13 (cal/cm³)$^{1/2}$ to 13.6 (cal/cm³)$^{1/2}$; and
    (B) a polyhydric alcohol fatty acid ester having a solubility parameter $\sigma_B$ of from 9 (cal/cm³)$^{1/2}$ to 9.5 (cal/cm³)$^{1/2}$,
    wherein the component (B) is contained in the amount of from 0.1 to 1 parts by weight on the basis of 100 parts by weight of the component (A).

2. The liquid crystalline polyester composition according to claim 1, wherein the difference ($\sigma_A-\sigma_B$) in the solubility parameters between the liquid crystalline polyester and the polyhydric alcohol fatty acid ester is in the range of form 3.8 (cal/cm³)$^{1/2}$ to 4.6 (cal/cm³)$^{1/2}$.

3. The liquid crystalline polyester composition according to claim 1, wherein the polyhydric alcohol fatty acid ester is a polyhydric alcohol fatty acid ester of which weight is reduced by 5% by weight at a temperature of about 250° C. on the basis of its weight at a temperature of 30° C. in a thermogravimetric analysis.

4. The liquid crystalline polyester composition according to claim 1, wherein the liquid crystalline polyester (A) is a liquid crystalline polyester having a flowing-out starting temperature of 280° C. or higher.

5. The liquid crystalline polyester composition according to claim 1, wherein the liquid crystalline polyester is a liquid crystalline polyester having:
    a structural unit derived from p-hydroxybenzoic acid and a structural unit derived from 2-hydroxy-6-naphthoic acid in the total amount of 30 to 80% by mole;
    a structural unit derived from 4,4'-dihydroxybiphenyl and a structural unit derived from hydroquinone in the total amount of 10 to 35% by mole; and
    a structural unit derived from terephthalic acid, a structural unit derived from isophthalic acid and a structural unit derived from 2,6-naphthalenedicarboxylic acid in the total amount of 10 to 35% by mole;
    the molar amounts above being on the basis of the total amounts of the entire structural units.

6. A molded article obtainable by molding the liquid crystalline polyester compositions according to claim 1.

7. The liquid crystalline polyester composition according to claim 1, wherein the component (A) has a solubility parameter $\sigma_A$ of from 13 (cal/cm³)$^{1/2}$ to 13.5 (cal/cm³)$^{1/2}$.

8. The liquid crystalline polyester composition according to claim 1, wherein the difference ($\sigma_A-\sigma_B$) in the solubility parameters between the liquid crystalline polyester and the polyhydric alcohol fatty acid ester is in the range of from 3.8 (cal/cm³)$^{1/2}$ to 4.5 (cal/cm³)$^{1/2}$.

9. The liquid crystalline polyester composition according to claim 1, wherein the component (A) has a solubility parameter $\sigma_A$ of 13.6 (cal/cm³)$^{1/2}$.

10. The liquid crystalline polyester composition according to claim 1, wherein the difference ($\sigma_A-\sigma_B$) in the solubility parameters between the liquid crystalline polyester and the polyhydric alcohol fatty acid ester is 4.6 (cal/cm³)$^{1/2}$.

* * * * *